United States Patent
Gajera et al.

(10) Patent No.: US 10,769,427 B1
(45) Date of Patent: Sep. 8, 2020

(54) DETECTION AND DEFINITION OF VIRTUAL OBJECTS IN REMOTE SCREENS

(71) Applicant: Automation Anywhere Inc., San Jose, CA (US)

(72) Inventors: Prakash Gajera, Vadodara (IN); Gaurang Patel, Fremont, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 124 days.

(21) Appl. No.: 15/957,030

(22) Filed: Apr. 19, 2018

(51) Int. Cl.
*G06K 9/00* (2006.01)
*G06K 9/40* (2006.01)
*G06F 9/451* (2018.01)
*G06K 9/62* (2006.01)
*G06N 3/08* (2006.01)
*G06N 3/04* (2006.01)

(52) U.S. Cl.
CPC ......... *G06K 9/00456* (2013.01); *G06F 9/452* (2018.02); *G06K 9/00463* (2013.01); *G06K 9/40* (2013.01); *G06K 9/6262* (2013.01); *G06K 2209/01* (2013.01); *G06N 3/04* (2013.01); *G06N 3/08* (2013.01)

(58) Field of Classification Search
CPC ............ H04N 21/4622; H04N 21/4438; G06F 3/04842; G06F 3/048; G06F 3/0484; G06F 9/452; G06K 7/1447; G06K 9/00456; G06K 9/00; G06K 9/00463; G06K 9/40; G06K 9/6262
See application file for complete search history.

(56) References Cited

U.S. PATENT DOCUMENTS

| | | | |
|---|---|---|---|
| 5,949,999 | A | 9/1999 | Song et al. |
| 5,983,001 | A | 11/1999 | Boughner et al. |
| 6,009,192 | A | 12/1999 | Klassen et al. |
| 6,009,198 | A | 12/1999 | Syeda-Mahmood |
| 6,133,917 | A | 10/2000 | Feigner et al. |

(Continued)

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

(Continued)

*Primary Examiner* — Jingge Wu
(74) *Attorney, Agent, or Firm* — Prasad IP, PC (57) ABSTRACT

Methods and systems that detect and define virtual objects in remote screens which do not expose objects. This permits simple and reliable automation of existing applications. In certain aspects a method for detecting objects from an application program that are displayed on a computer screen is disclosed. An image displayed on the computer screen is captured. The image is analyzed to identify blobs in the image. The identified blobs are filtered to identify a set of actionable objects within the image. Optical character recognition is performed on the image to detect text fields in the image. Each actionable object is linked to a text field positioned closest to a left or top side of the actionable object. The system automatically detects the virtual objects and links each actionable object such as textboxes, buttons, checkboxes, etc. to the nearest label object.

20 Claims, 8 Drawing Sheets

(56) References Cited

U.S. PATENT DOCUMENTS

| | | | |
|---|---|---|---|
| 6,389,592 B1 | 5/2002 | Ayres et al. | |
| 6,427,234 B1 | 7/2002 | Chambers et al. | |
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 7,091,898 B2 | 8/2006 | Arling et al. | |
| 7,246,128 B2 | 7/2007 | Jordahl | |
| 7,441,007 B1 | 10/2008 | Kirkpatrick et al. | |
| 7,533,096 B2 | 5/2009 | Rice et al. | |
| 7,568,109 B2 | 7/2009 | Powell, Jr. et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,234,622 B2 | 7/2012 | Meijer et al. | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,510,668 B1 * | 8/2013 | Raskin | G06F 3/0484 715/767 |
| 8,682,083 B2 | 3/2014 | Kumar et al. | |
| 8,724,907 B1 | 5/2014 | Sampson et al. | |
| 8,769,482 B2 | 7/2014 | Batey et al. | |
| 8,965,905 B2 | 2/2015 | Ashmore et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,483,389 B2 * | 11/2016 | Shen | G06F 11/3664 |
| 9,864,933 B1 * | 1/2018 | Cosic | G06K 9/66 |
| 10,025,773 B2 | 7/2018 | Bordawekar et al. | |
| 10,078,743 B1 | 9/2018 | Baldi et al. | |
| 10,204,092 B2 * | 2/2019 | Venkataraman | G06F 8/65 |
| 10,318,411 B2 * | 6/2019 | Falkenberg | G06F 11/3668 |
| 10,452,974 B1 * | 10/2019 | Cosic | G06N 5/022 |
| 2002/0002932 A1 | 1/2002 | Winterowd | |
| 2003/0033590 A1 | 2/2003 | Leherbauer | |
| 2003/0101245 A1 | 5/2003 | Srinivasan et al. | |
| 2003/0159089 A1 | 8/2003 | Dijoseph | |
| 2004/0083472 A1 | 4/2004 | Rao et al. | |
| 2004/0158455 A1 | 8/2004 | Spivack et al. | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0002566 A1 | 1/2005 | Federico et al. | |
| 2005/0144462 A1 | 6/2005 | LaGarde | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0045337 A1 | 3/2006 | Shilman et al. | |
| 2006/0070026 A1 | 3/2006 | Balinsky et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2008/0005086 A1 | 1/2008 | Moore | |
| 2008/0028392 A1 | 1/2008 | Chen et al. | |
| 2008/0104032 A1 | 5/2008 | Sarkar | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 * | 4/2009 | Milov | G06F 9/45512 382/100 |
| 2009/0113449 A1 * | 4/2009 | Balfe | G06F 9/546 719/314 |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0013848 A1 | 1/2010 | Hekstra et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0235433 A1 | 9/2010 | Ansari et al. | |
| 2011/0022578 A1 | 1/2011 | Fotev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0042281 A1 | 2/2012 | Green | |
| 2012/0076415 A1 | 3/2012 | Kahn | |
| 2012/0124062 A1 | 5/2012 | Macbeth et al. | |
| 2012/0154633 A1 | 6/2012 | Rodriguez | |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2014/0282013 A1 * | 9/2014 | Amijee | G06F 16/4393 715/732 |
| 2015/0082280 A1 | 3/2015 | Betak et al. | |
| 2015/0306763 A1 * | 10/2015 | Meier | G05B 19/42 700/248 |
| 2015/0339213 A1 * | 11/2015 | Lee | G06F 11/3664 717/125 |
| 2015/0347284 A1 | 12/2015 | Hey et al. | |
| 2015/0370688 A1 * | 12/2015 | Zhang | G06F 11/3688 717/125 |
| 2015/0378876 A1 * | 12/2015 | Ji | G06F 11/3688 714/38.1 |
| 2016/0019049 A1 | 1/2016 | Kakhandiki et al. | |
| 2016/0078368 A1 | 3/2016 | Kakhandiki et al. | |
| 2016/0101358 A1 * | 4/2016 | Ibrahim | G06T 7/11 463/33 |
| 2016/0119285 A1 | 4/2016 | Kakhandiki et al. | |
| 2017/0060108 A1 | 3/2017 | Kakhandiki et al. | |
| 2017/0154230 A1 | 6/2017 | Dow et al. | |
| 2017/0213130 A1 | 7/2017 | Khatri et al. | |
| 2017/0330076 A1 | 11/2017 | Valpola | |
| 2018/0004823 A1 | 1/2018 | Kakhandiki et al. | |
| 2018/0157386 A1 | 6/2018 | Su | |
| 2018/0173698 A1 | 6/2018 | Dubey et al. | |
| 2018/0196738 A1 * | 7/2018 | Murata | G06F 11/3684 |
| 2018/0232888 A1 * | 8/2018 | Thevenet | G06T 7/194 |
| 2018/0285634 A1 * | 10/2018 | Varadarajan | G06K 9/6274 |
| 2019/0236411 A1 * | 8/2019 | Zhu | G06K 9/4628 |

OTHER PUBLICATIONS

Zhifang et al., Test automation on mobile device, May 2010, 7 pages.

Hu et al., Automating GUI testing for Android applications, May 2011, 7 pages.

Tom Yeh, Tsung-Hsiang Chang, and Robert C. Miller, Sikuli: Using GUI Screenshots for Search and Automation, Oct. 4-7, 2009, 10 pages.

Bergen et al., RPC automation: making legacy code relevant, May 2013, 6 pages.

Alex Krizhevsky, Ilya Sutskever, and Geoffrey E Hinton, Imagenet classification with deep convolutional neural networks, Advances in neural information processing systems (2012).

Andrew G Howard, Menglong Zhu, Bo Chen, Dmitry Kalenichenko, Weijun Wang, Tobias Weyand, Marco Andreetto, and Hartwig Adam, Mobilenets: Efficient convolutional neural networks for mobile vision applications, arXiv:1704.04861v1 (2017).

Chollet, Francois et al., Keras: The Python Deep Learning Library, GitHub, https://github/keras-team/keras, 2015.

Christian Szegedy, Wei Liu, Yangqing Jia, Pierre Sermanet, Scott Reed, Dragomir Anguelov, Dumitru Erhan, Vincent Vanhoucke, and (56) References Cited

OTHER PUBLICATIONS

Andrew Rabinovich, Going deeper with convolutions, Proceedings of the IEEE conference on computer vision and pattern recognition, pp. 1-9 (2015).
J. Canny, A computational approach to edge detection, IEEE Transactions on Pattern Analysis and Machine Intelligence, PAMI-8(6):679-698, Nov. 1986.
Jifeng Dai, Yi Li, Kaiming He, and Jian Sun, R-fcn: Object detection via region-based fully convolutional networks, Advances in neural information processing systems, 2016.
Joseph Redmon, Santosh Divvala, Ross Girshick, and Ali Farhadi, You only look once: Unified, real-time object detection, Proceedings of the IEEE conference on computer vision and pattern recognition, pp. 779-788, 2016.
Kaiming He, Xiangyu Zhang, Shaoqing Ren, and Jian Sun, Deep residual learning for image recognition, Proceedings of the IEEE conference on computer vision and pattern recognition (2016).
Koen EA Van De Sande, Jasper RR Uijlings, Theo Gevers, and Arnold WM Smeulders, Segmentation as Selective search for Object Recognition, International journal of computer vision, 104(2) (2013).
M. A. Hearst, S. T. Dumais, E. Osuna, J. Platt, and B. Scholkopf, Support vector machines, IEEE Intelligent Systems and their Applications, 13(4):18-28, Jul. 1998.
Meng Qu, Xiang Ren, and Jiawei Han, "Automatic Synonym Discovery with Knowledge Bases". In Proceedings of KDD'I 7, Aug. 13-17, 2017, Halifax, NS, Canada, DOI: 10.1145/3097983.3098185(Year: 2017).
Minghui Liao, Baoguang Shi, Xiang Bai, Xinggang Wang, Wenyu Liu, "TextBoxes: A Fast Text Detector with a Single Deep Neural Network", arXiv:1611.06779v1[cs.CV] Nov. 21, 2016 (Year: 2016).
Navneet Dalal and Bill Triggs, Histograms of oriented gradients for human detection, International Conference on computer vision & Pattern Recognition (CVPR'05), vol. 1, pp. 886-893. IEEE Computer Society, 2005.
Ross Girshick, Fast r-cnn, Proceedings of the IEEE international conference on computer vision (2015).
Ross Girshick, Jeff Donahue, Trevor Darrell, and Jitendra Malik, Rich feature hierarchies for accurate object detection and semantic segmentation, Proceedings of the IEEE conference on computer vision and pattern recognition (2014).
Shaoqing Ren, Kaiming He, Ross Girshick, and Jian Sun, Faster r-cnn: Towards real-time object detection with region proposal networks, Advances in neural information processing systems, 2015.
Tsung-Yi Lin, Michael Maire, Serge Belongie, James Hays, Pietro Perona, Deva Ramanan, Piotr Dollár, and C Lawrence Zitnick, Microsoft coco: Common objects in context, European conference on computer vision (2014).
Tsung-Yi Lin, Priya Goyal, Ross Girshick, Kaiming He, and Piotr Dollár, Focal loss for dense object detection, Proceedings of the IEEE international conference on computer vision (2017).
Wei Liu, Dragomir Anguelov, Dumitru Erhan, Christian Szegedy, Scott Reed, Cheng-Yang Fu, and Alexander C Berg, Ssd: Single shot multibox detector, European conference on computer vision, pp. 21-37. Springer, 2016.
X. Yang, E. Yumer, P. Asente, M. Kraley, D. Kifer and C. L. Giles, "Learning to Extract Semantic Structure from Documents Using Multimodal Fully Convolutional Neural Networks," 2017 IEEE CVPR, Honolulu, HI, 2017, pp. 4342-4351. doi: 10.1109/CVPR.2017.462 (Year: 2017).

\* cited by examiner

DETECTION AND DEFINITION OF VIRTUAL OBJECTS IN REMOTE SCREENS

RELATED APPLICATIONS

This application is related to the following pending patent applications which are assigned to the assignee of the present application:

System And Method For Resilient Automation Upgrade, filed in the U.S. Patent Office on Aug. 25, 2015, and assigned application Ser. No. 14/834,773;

System and Method for Compliance Based Automation, filed in the U.S. Patent Office on Jan. 6, 2016, and assigned application Ser. No. 14/988,877;

Automatic Key/Value Pair Extraction From Document Images Using Deep Learning, filed in the U.S. Patent Office on Dec. 29, 2017, and assigned application Ser. No. 15/858,976; and Optical Character Recognition Employing Deep Learning With Machine Generated Training Data, filed in the U.S. Patent Office on Dec. 21, 2017, and assigned application Ser. No. 15/851,617.

FIELD OF THE DISCLOSURE

This disclosure relates generally to the field of data processing systems and more particularly to interaction with information on remote computers.

BACKGROUND

Robotic process automation (RPA) is the application of technology that allows employees in a company to configure computer software or a "robot" to capture and interpret existing applications for processing a transaction, manipulating data, triggering responses and communicating with other digital systems. Conventional RPA systems employ software robots to interpret the user interface of third party applications and to execute steps identically to a human user. While this approach can be quite useful in enabling RPA, it typically requires human usage of an application which can introduce errors due to mistakes and idiosyncrasies of a particular user.

SUMMARY

Methods and systems that detect and define virtual objects in remote screens which do not expose objects are disclosed herein. This permits simple and reliable automation of existing applications. In certain aspects a method for detecting objects from an application program that are displayed on a computer screen is disclosed. An image displayed on the computer screen is captured. The image is analyzed to identify blobs in the image. The identified blobs are filtered to identify a set of actionable objects within the image. Optical character recognition is performed on the image to detect text fields in the image. Each actionable object is linked to a text field positioned closest to a left or top side of the actionable object. The system automatically detects the virtual objects and links each actionable object such as textboxes, buttons, checkboxes, etc. to the nearest label object. Advanced image processing and OCR technologies may advantageously be employed. In other aspects, background noise is removed from the image before analyzing the image to identify blobs in the image. Additionally, filtering the identified blobs may comprise retrieving one or more predefined filtering criteria that cause blobs larger or smaller than predefined sizes to be filtered out. Subsequently, when the application is accessed in a production environment by a bot, interaction with the application may be simplified as the bot retrieves the stored actionable objects and in some instances be able to employ the previously recognized actionable objects.

The disclosed methods and systems permit accurate identification, and hence automation, of applications for which only a screen image may be available to an automation user, as is common where the automation user is located remotely from the system on which the application to be automated is deployed. This permits a level of automation previously only available where underlying objects in the application to be automated are available to the system employed by the automation user. Moreover, the disclosed methods and systems permit automation even where changes in the application or to hardware, such as resolution of computer monitors, can cause changes in the visual image displayed by the application to be automated.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
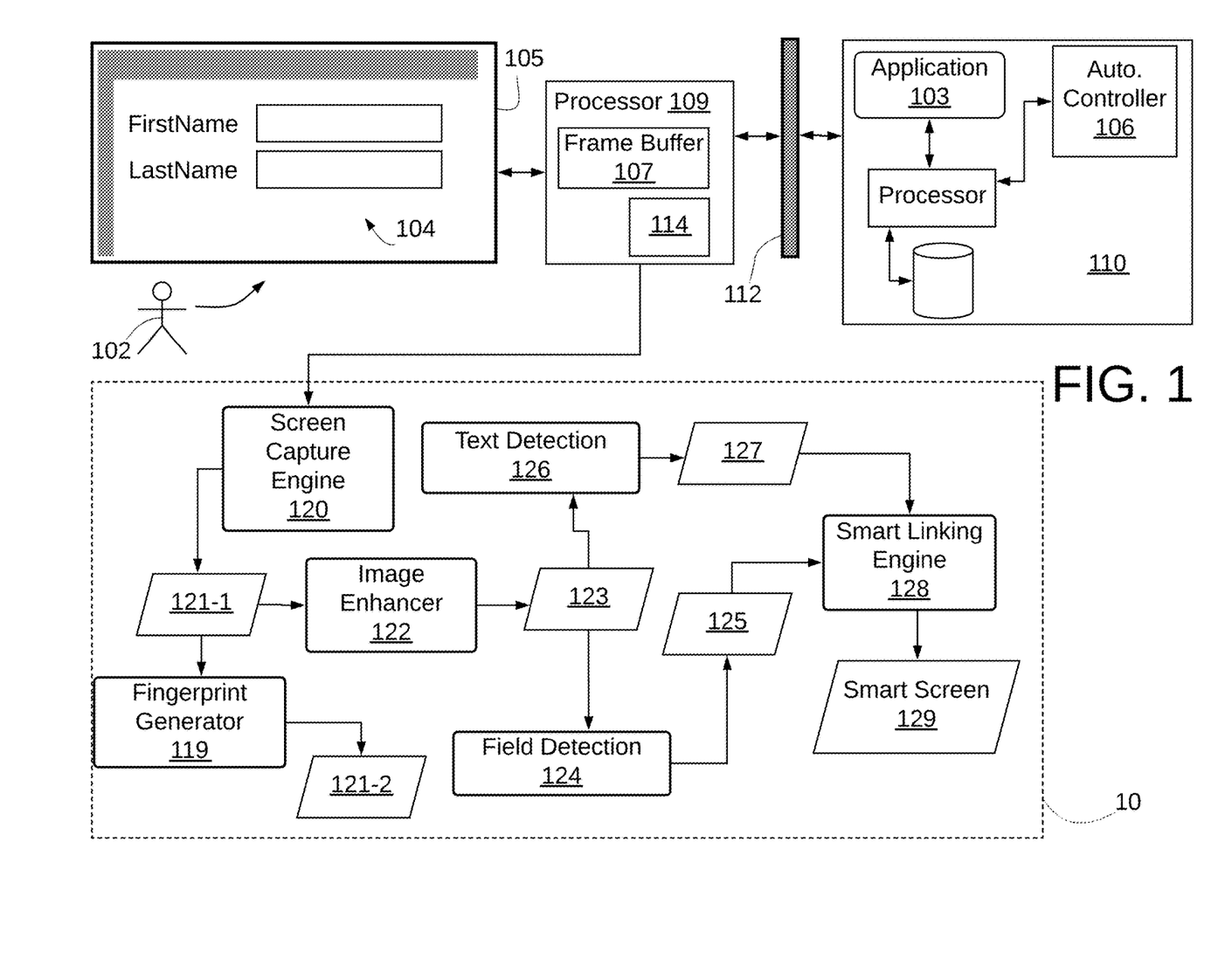
FIG. 1 is a high-level block diagram illustrating operation of a smart screen system.

The innovations described herein may find numerous uses and may be particularly advantageous in the context of an RPA system 10, as shown in FIG. 1. A user 102 interacts with an application 103 via one or more application screens, one of which is seen at 104, which is provided via a conventional computer display 105, controlled by a processor which provides via frame buffer 107, images for display on the display 105. The application 103 is provided by way of a computer system 110, which includes a processor and storage, and which may be located remotely from the user 102. The computer system 110 executes a local instance of automation controller software 106 that may be enabled by a system administrator to enable remote operation of the application 103, such as by user 102.

In certain environments, the information provided by application 103 may contain sensitive information, the distribution or viewing of which may be subject to various regulatory or other restrictions. Automation controller 106, resident on computer system 110, operates in conjunction with RPA system 10, to interact with computer system 110. The RPA system 10 sends automation commands and queries to the automation controller 106, while respecting the security compliance protocols of computer system 110. In certain embodiments, a compliance boundary 112 may be implemented in connection with remote access module 114. Compliance boundary 112 represents a logical boundary, across which, any transfer of data or other information is controlled by agreements between parties. In certain embodiments, remote access module 114 may operate to prevent RPA user 102 from performing certain tasks on system 110, by way of example and not limitation, copying files, loading cookies, or transmitting data from computer system 110, through or beyond compliance boundary 112 via the internet or via any other output device that would violate the security protocols established by the computer system 110. The remote access module 114 may take the form of remote desktop products available from Citrix or Microsoft, which permit connection to a remote computer, such as computer system 110, to establish a communication link between system 10 and system 110 to permit apps, files, and network resources to be made available from computer system 110 to computer system 10.

The RPA system 10 implements a bot creator that may be used by RPA user 102, to create one or more bots that are used to automate various business processes executed by one or more computer applications such as application 103. The term "bot" as used herein refers to a set of instructions that cause a computing resource to interact with one or more user level computer applications to perform tasks provided by the one or more user level computer applications. Once created, the bot may be employed to perform the tasks as encoded by the instructions to interact with one or more user level computer applications. RPA user 102 may access application 103 remotely and may see the same screen 104 as seen by a user that may be located proximate to the computer system 110. Remote access module 112 may be configured to provide to user 102 only screen images generated by application 103. In such an instance, the bot creator employed by the user 102 will not be able to access any user interface level objects that may be employed by the application 103, such as HTML document models or an accessibility API provided by an operating system.

Conventionally, user 102 may manually identify fields provided by application 103. In the embodiments disclosed herein, RPA system 10 operates to automatically identify fields provided by application 103. A screen capture engine 120 operates conventionally to generate image file 121-1 by capturing an image displayed on computer screen 105 by operation of application 103. As will be appreciated by those skilled in the art, screen capture engine 120 operates by accessing frame buffer 107 employed by computer system 10. The frame buffer 107 contains a bitmap, a frame of data, of the image currently displayed on computer screen 105. The computer system 110 may be separate from or part of smart screen system 10.

The fingerprint generator 119 analyzes the image file 121-1 for various objects, such as automation controls (markers) and their locations. The combination of various objects, object metadata, properties and types, and location on the screen is used to generate a unique set of keys that can together represent a "fingerprint" or signature 121-2 of that screen that assists the automation application to recognize that specific screen, among a set of any other possible screens, as disclosed in pending patent application entitled "System And Method For Resilient Automation Upgrade" filed in the U.S. Patent Office on Aug. 25, 2015 and assigned application Ser. No. 14/834,773, and pending patent application entitled "System and Method for Compliance Based Automation" filed in the U.S. Patent Office on Jan. 6, 2016 and assigned application Ser. No. 14/988,877, which applications are hereby incorporated by reference in their entirety. The signature 121-2 is stored to a signature database corresponding to the application 103.

Figure 2A:
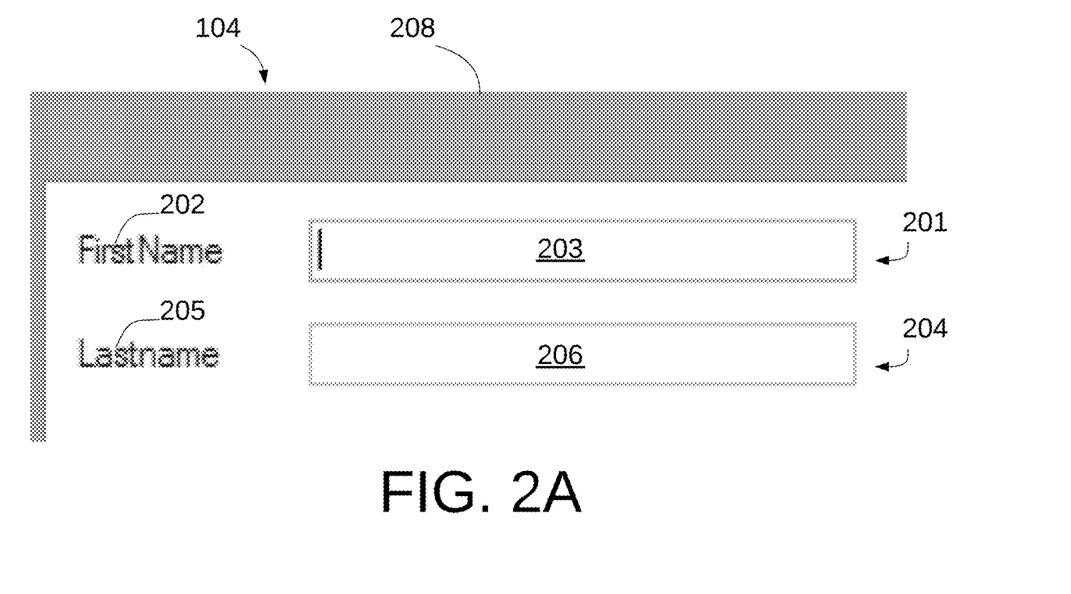
FIG. 2A is a screen shot of a portion of an application screen.

The image file 121-1, representing image 104, as captured by screen capture engine 120 is shown in further detail in FIG. 2A. The image file 121-1 may be encoded as a conventional image file and contains a number of objects which may be used for providing data to or receiving data from a user. Two objects are seen at 201 and 204. Object 201 is a first name field containing a label 202 "FirstName" and a data entry field 203 into which a user may enter data corresponding to the "FirstName" label 202. Object 204 is a last name field containing a label 205 "Lastname" and a data entry field 206 into which the user may enter data corresponding to the "Lastname" label 205. The image in image file 121-1 also includes a header image 208. Objects 201 and 204 are generated by application 103 which associates data field 203 with label 202 and data field 206 with label 205. These objects, and their associated labels and data fields are not discernible as such in the image in image file 121-1 which is a conventional image encoded file. The system 10 advantageously operates to automatically identify objects such as objects 201 and 204 in the image file 121-1.

The image in the image file 121-1 is enhanced by image enhancer 122 to remove background noise that may be contained in the image file 121-1, and the results are stored in file 123. For example, certain screens from which image 104 is captured may contain background colors or watermarks upon which the image 104 is overlayed. Furthermore, a document image may exist with a wide variety of fonts, fonts sizes, background patterns, and lines (e.g., to delineate table columns). Image enhancer 122 in certain embodiments operates conventionally to transform the image file 121-1 from the color space to the background space and to remove background noise from the image file 121-1 to generate image file 123. The image file 123 contains an enhanced version of the image in image file 121-1. This increases the likelihood of correct recognition of automation control elements in the image file 121-1. For example, if the image file 121-1 contains an automation control in the form of a radio button, the conversion from color to black and white and the background noise removal increases the likelihood of recognition of the radio button.

Figure 2B:
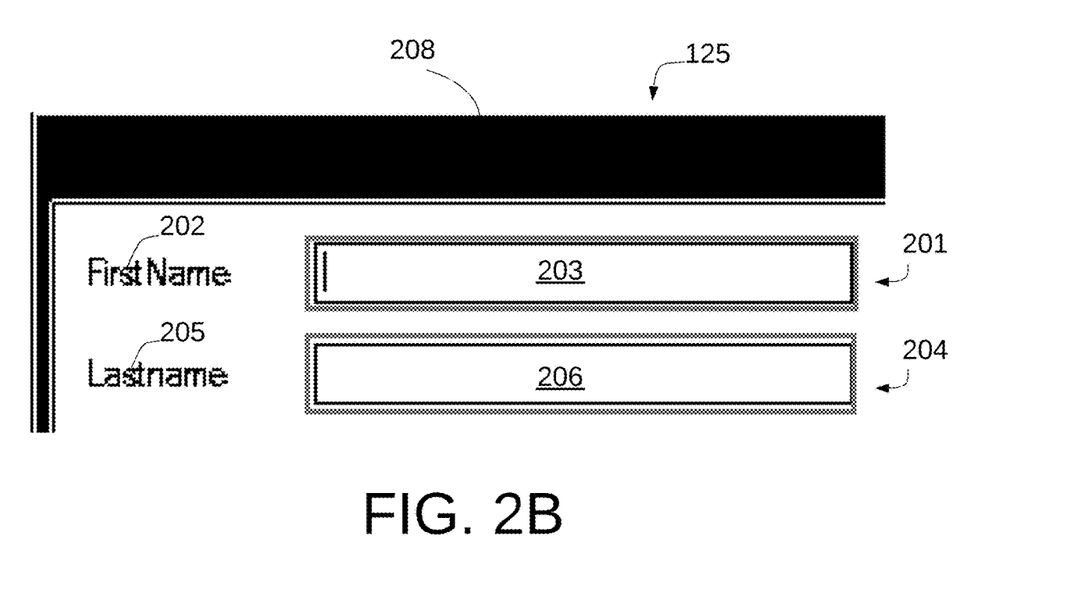
FIG. 2B is a screen shot of the application screen of FIG. 2A processed to generate a binarized image with blobs.

Image file 123 is processed by field detection module 124 to generate, as shown in FIG. 2B, a binarized image 210 with objects 201 and 204 recognized as blobs (binary large objects). Field detection module 124 employs a blob (rectangle) area detection algorithm to detect all the blobs in the file 123. Field detection module 124 further filters unwanted blobs like very small or very big blobs to generate the actual blob objects which are actionable objects 201, 204 as shown in the binarized image 210. In certain embodiments, multiple detection algorithms may be used to increase the likelihood of correct detection. For example, each detection algorithm may provide a confidence score and successive detection algorithms may be used until a confidence score above a predetermined threshold is attained. In certain embodiments, pretraining may be performed with a set of training images to increase the chances of proper detection. In certain embodiments, the field detection 124 and text detection 126 modules employ ongoing training to increase accuracy with further usage. In such training, the user may confirm, at times, the result provided by the modules 124 and 126 to increase the training input. In one embodiment, the field detection module 124 may operate as described in the patent application entitled "Automatic Key/Value Pair Extraction From Document Images Using Deep Learning" filed in the U.S. Patent Office on Dec. 29, 2017 and assigned application Ser. No. 15/858,976, which application is hereby incorporated by reference in its entirety.

Figure 2C:
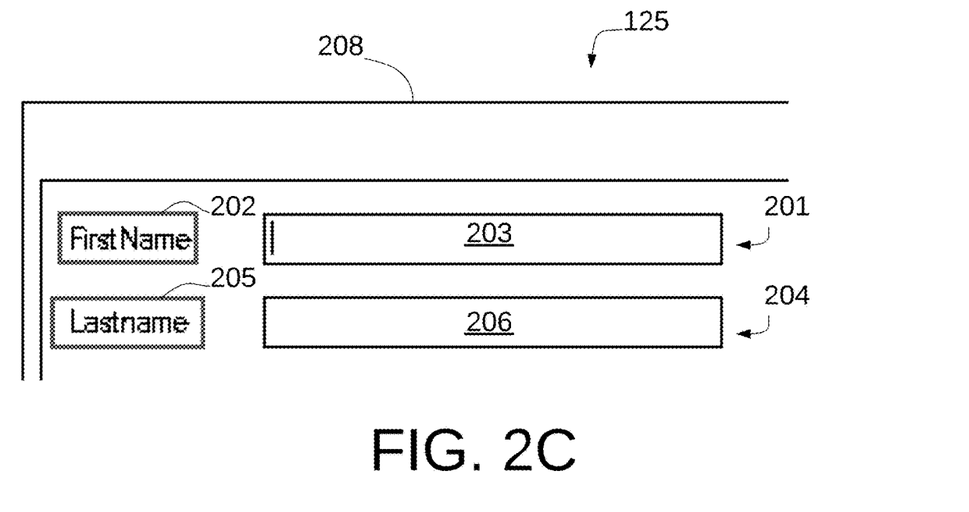
FIG. 2C is a screen shot of the image of FIG. 2B processed to generate an OCR image with text fields.
Figure 2D:
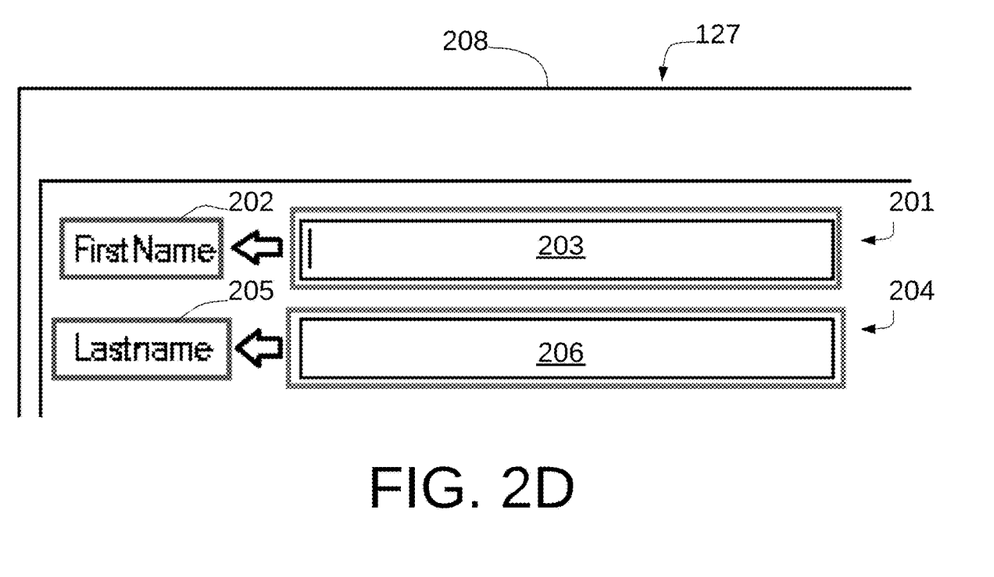
FIG. 2D is a screen shot of the image of FIG. 2C processed to generate a screen with linked fields.

The image file 123 is also processed by text detection module 126 to generate a binarized image 125, shown in FIG. 2C with detected text fields 202 and 205. The text detection module 114 may employ a conventional OCR program, such as the Tesseract Open Source OCR Engine available from GitHub (https://github.com/tesseract-ocr/tesseract). In one embodiment, the OCR capability may operate as described in the patent application entitled "Optical Character Recognition Employing Deep Learning With Machine Generated Training Data" filed in the U.S. Patent Office on Dec. 21, 2017 and assigned application Ser. No. 15/851,617, which application is hereby incorporated by reference in its entirety. The described system employs a Deep Neural Network (DNN) to automatically recognize text strings within scanned images.

As seen in FIGS. 2B and 2C, the representation of the image operated on by modules 124 and 126 is rendered on a blank canvas (with no noise) and preserves the X, Y coordinates of the labels and fields. Backgrounds, patterns, and lines from the original image may also be dropped to result in an image that is noise free, uniform font rendering of the original document providing a simplified image. In employing a system utilizing a Deep Neural Network (DNN) as described in the aforementioned patent application, this pre-processing advantageously reduces the statistical distribution of input images and facilitates learning by the DNN.

The blobs recognized by module 124 and text detected by module 126 are linked by smart linking engine 118 by linking each blob to its nearest text field on the left or top side. This may be performed by retrieving common patterns and applying them to link labels to values. Certain embodiments may utilize machine learning to detect patterns, and to do so on an ongoing basis to increase accuracy. In certain embodiments pretraining may be employed to increase accuracy from the outset. By this auto linking capability, the system 10 detects and identifies the same objects even if the location of the text fields changes. Because of the normalization, the same pattern can be recognized at any scale so the system 10 can also identify the correct fields even if the scaling of the screen changes.

Figure 2E:
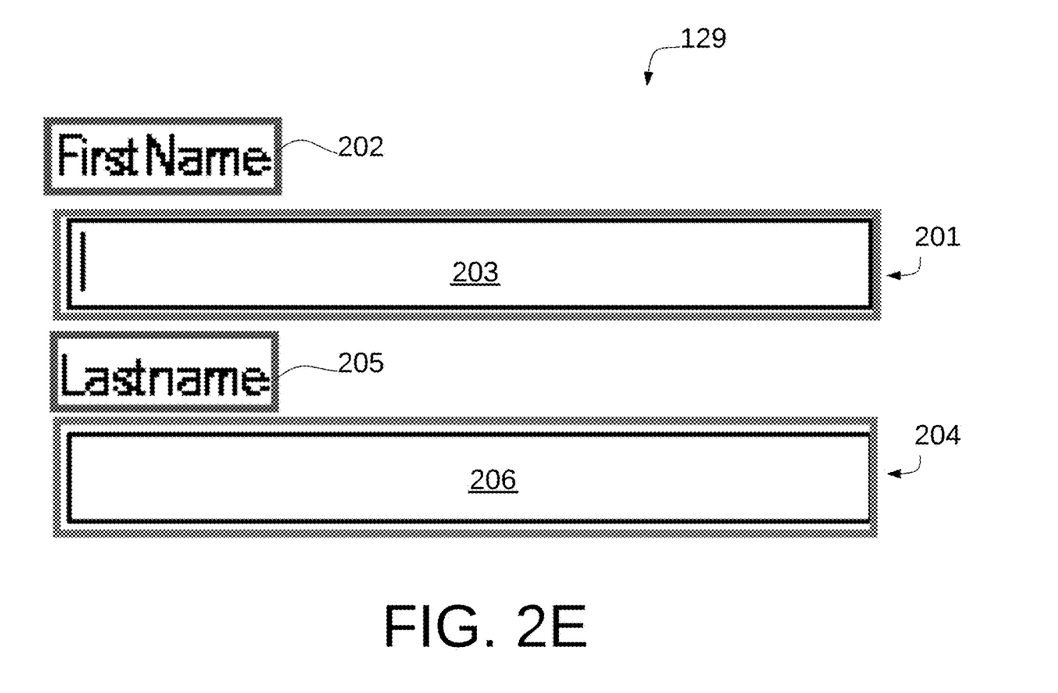
FIG. 2E is a screen shot of the image of FIG. 2D processed to generate a dynamic screen with linked fields.

FIG. 2E illustrates output of smart linking engine 128. As seen, data entry field 203 is linked with the nearest recognized text field to the top or left which is FirstName label 202 containing recognized text "FirstName". Data entry field 206 is linked with the nearest recognized text field to the top or left which is Lastname label 205 containing recognized text "Lastname". The smart linking engine 128 generates a dynamic screen 129, shown in FIG. 2E, with linked fields.

The smart screen 129 includes the image+recognized object (labels and values), which are sometimes referred to collectively as automation or actionable objects. Each automation object has associated with it custom automation controls, which can take the form of a drop down, radio button etc. The knowledge of the type of automation control permits the RPA system 10 to identify the type of input required for each automation control.

Figure 3A:
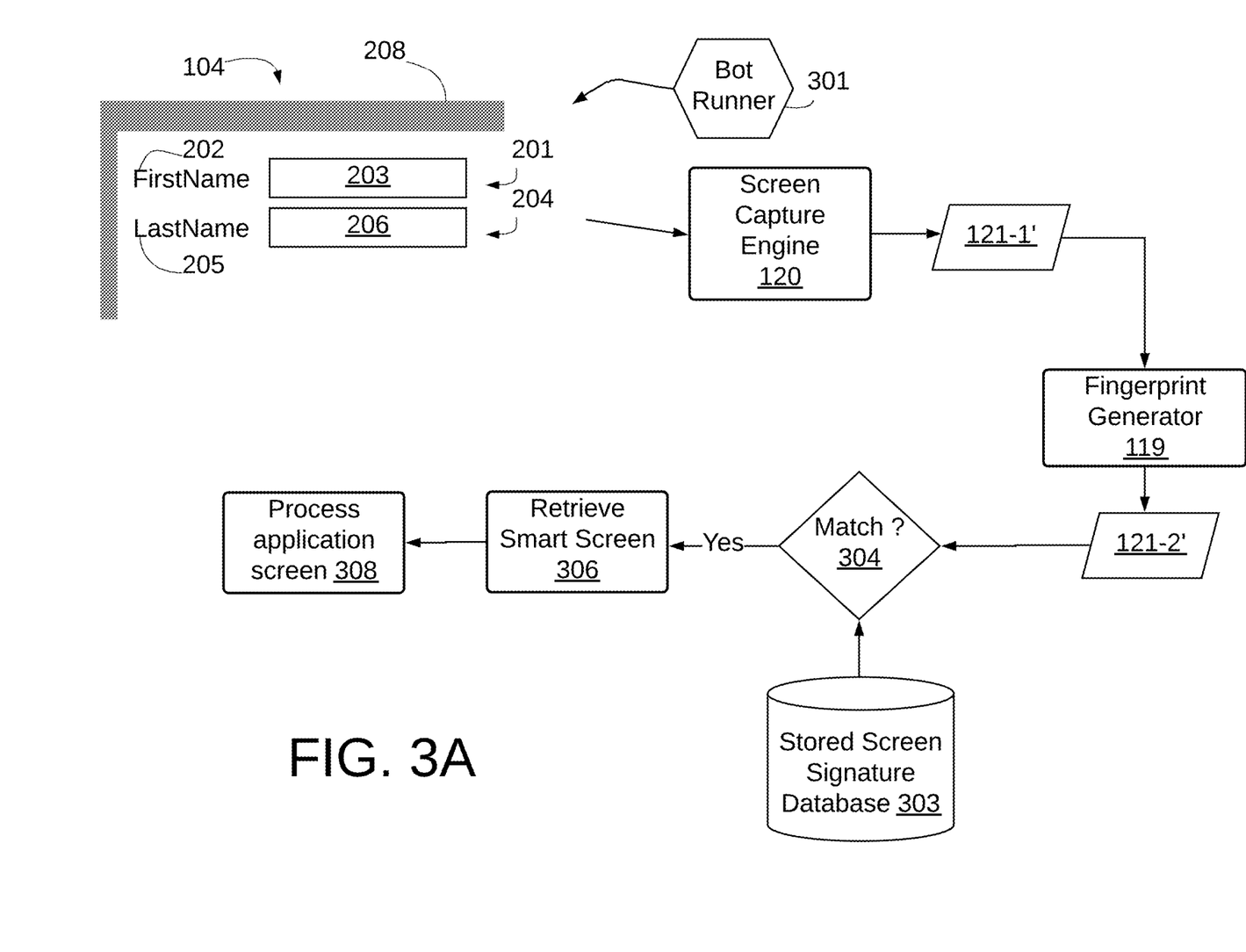
FIGS. 3A, 3B and 3C are flow diagrams illustrating different embodiments of use of smart screens.
Figure 3B:
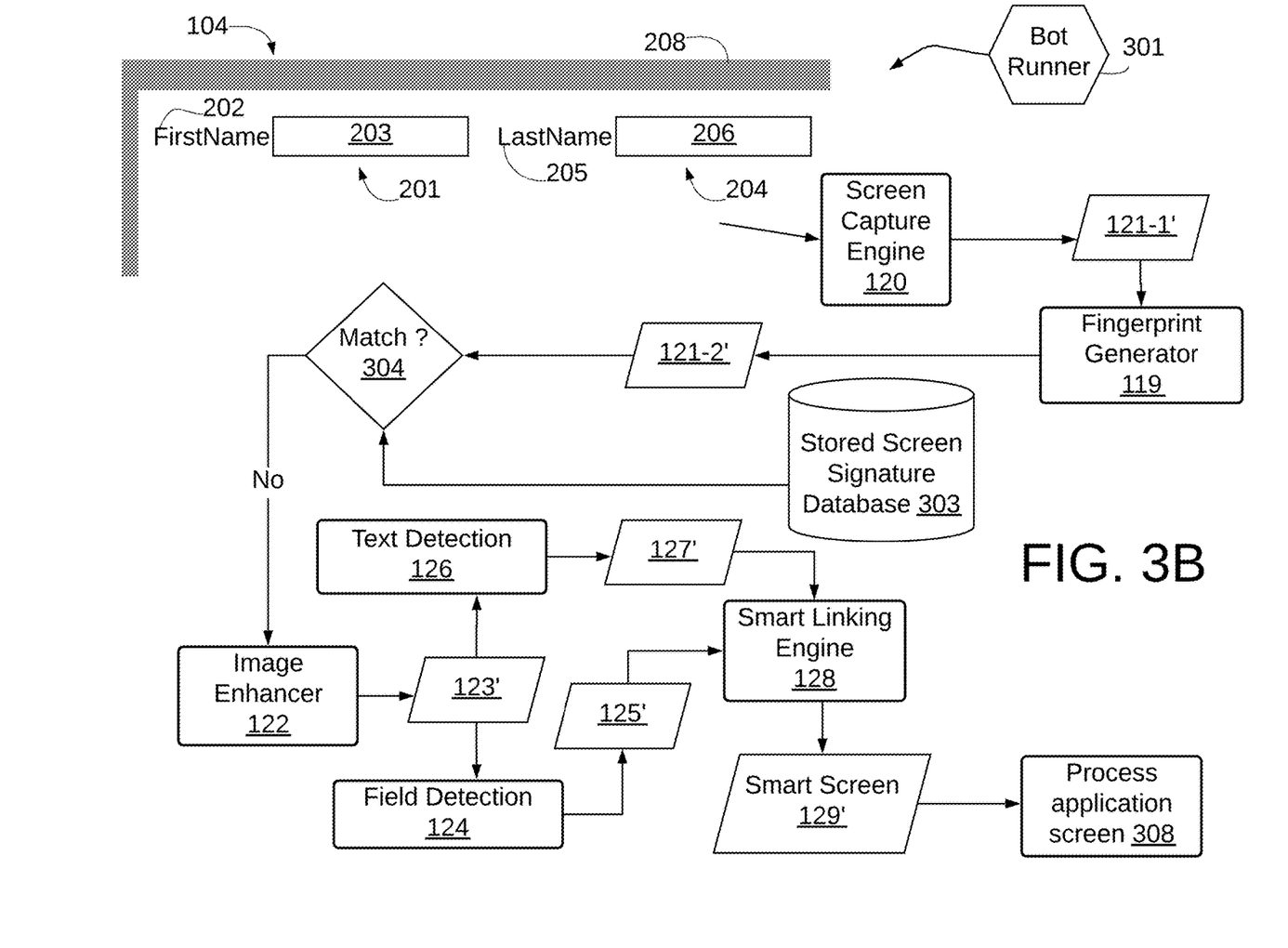
Figure 3C:
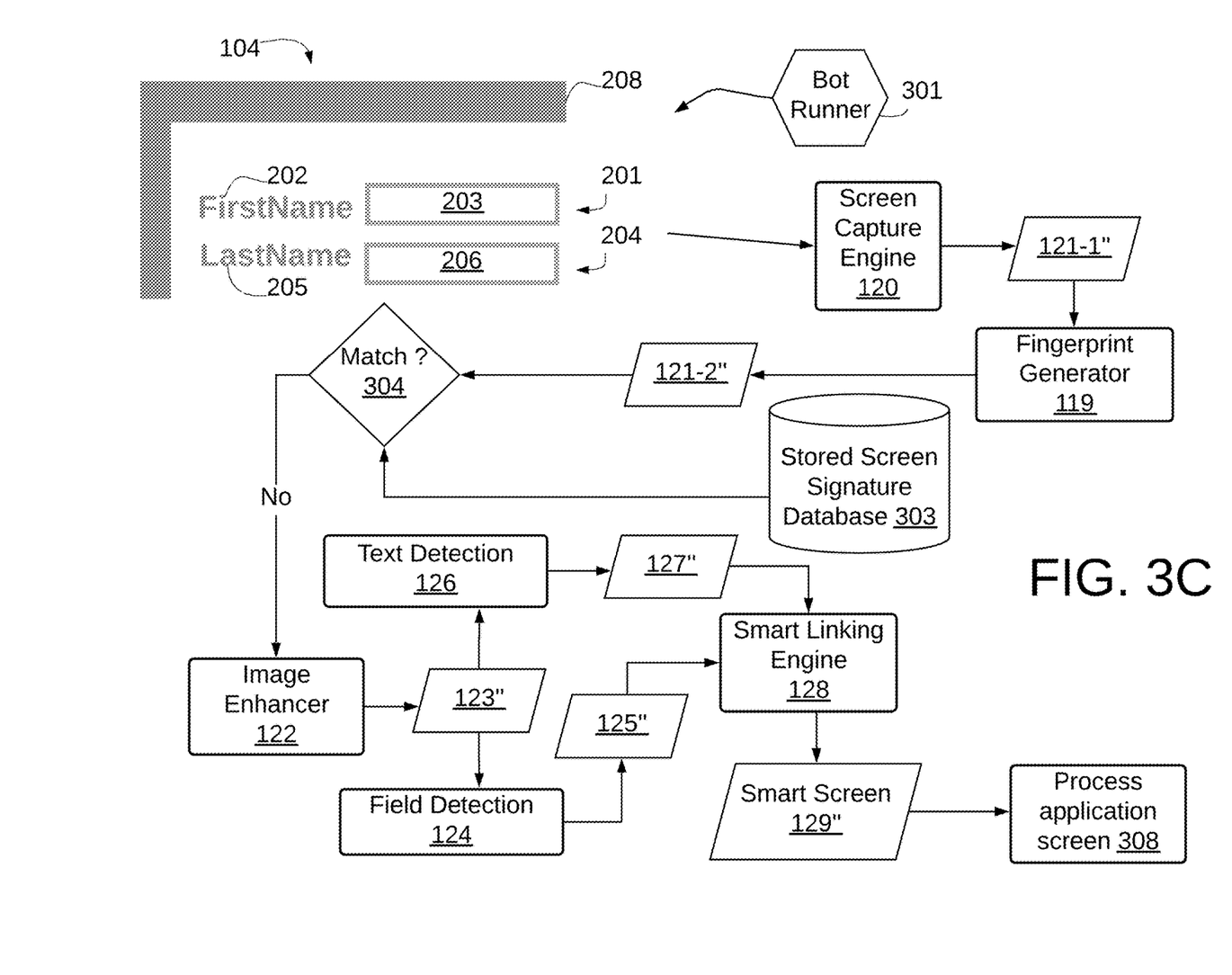

FIGS. 3A, 3B and 3C are flowcharts that show the operation of a bot runner 301 deployed pursuant to creation of the bot in conjunction with the system 10. In one embodiment, the process and mechanisms described in conjunction with FIGS. 1 and 2A-2E are performed upon each operation of bot runner 301. FIGS. 3A, 3B and 3C illustrate an alternative embodiment of operation of bot runner 301 in which a comparison of the fingerprint of each screen is performed to determine if a stored smart screen 129 corresponding to the active screen being processed by the bot runner 301 may be employed. Application screen 104 may be generated and accessed as described in connection with FIG. 1. In FIG. 3A, the screen 104 is captured by the screen capture engine 120 in the manner as described in FIG. 1 to generate image file 121-1' which is then processed by fingerprint generator 119 as described in connection with FIG. 1 to generate signature 121-2'. The signature 121-2' is compared with signatures stored in Stored Screen Signature database 303 at 304 against stored signatures. If a match is identified between the signature corresponding to the application screen 104 currently being displayed by application 103, then the screen 104 currently being processed by bot 301 is the same as a smart screen 129 that has been generated and stored by system 10, the stored smart screen 129 corresponding to the screen 104 currently being processed by bot 301 may be retrieved, employing the signature 121-1', which will correspond to signature 121-1, as shown at 306. The retrieved smart screen 129 may be used by the bot 301 at 308 to process the application screen 104. As seen, in such an instance, the further processing of the image file 121-1 is not necessary, thus saving processing time and power.

FIGS. 3B and 3C illustrate screens that contain the same fields and labels as in FIG. 3A but with different placement, and hence illustrate another benefit of smart screens. As seen in FIG. 3B, the positional relationship between objects 201 and 204 has changed, with LastName label and field, 205, 206 being to the right of the FirstName label and field 202, 203. As in FIG. 3A, the image 104 is captured by screen capture engine 120 to generate image file 121-1'. Fingerprint generator 119 generates signature 121-2' which is then compared with signatures stored in stored screen signature database 303 at 304 against stored signatures. In this case, because the positional relationship of the fields 201 and 204 has changed, the signatures 121-2 and 121-2' will differ. Consequently, as seen, the image file 121-1' is processed as image file 121-1 in FIG. 1 to generate a new smart screen 129', which is stored to stored screen signature database 303 and which is then used at 308 to process the application screen 104 currently being processed by bot runner 301.

FIG. 3C shows another example where the sizing and shading of the fonts and fields has changed somewhat, as may occur on a lower resolution screen. In such a case the signature 121-2" will not match any signature in the stored screen signature database 303 at 304 and hence the image file 121-1 will be processed as image file 121-1' as described in connection with FIG. 3B. As seen, visual changes in the labels and fields of a recognized screen for which a smart-screen has been generated result in the same accuracy as if the underlying objects on the screen image were exposed to the RPA system.

Some examples of automation objects are text fields, radio buttons, drop downs, and tabular data. In some embodiments, the system 10 may use a combination of image recognition and object recognition in a sequence to improve successful recognition. The representation of the data structures such as image file 121-1, signature 122-2, and the outputs of the various modules such as 125 and 127 may take a variety of forms such as individual files stored within a file system or may be stored within a single file or may be stored and managed by a database or may take other forms.

Figure 4:
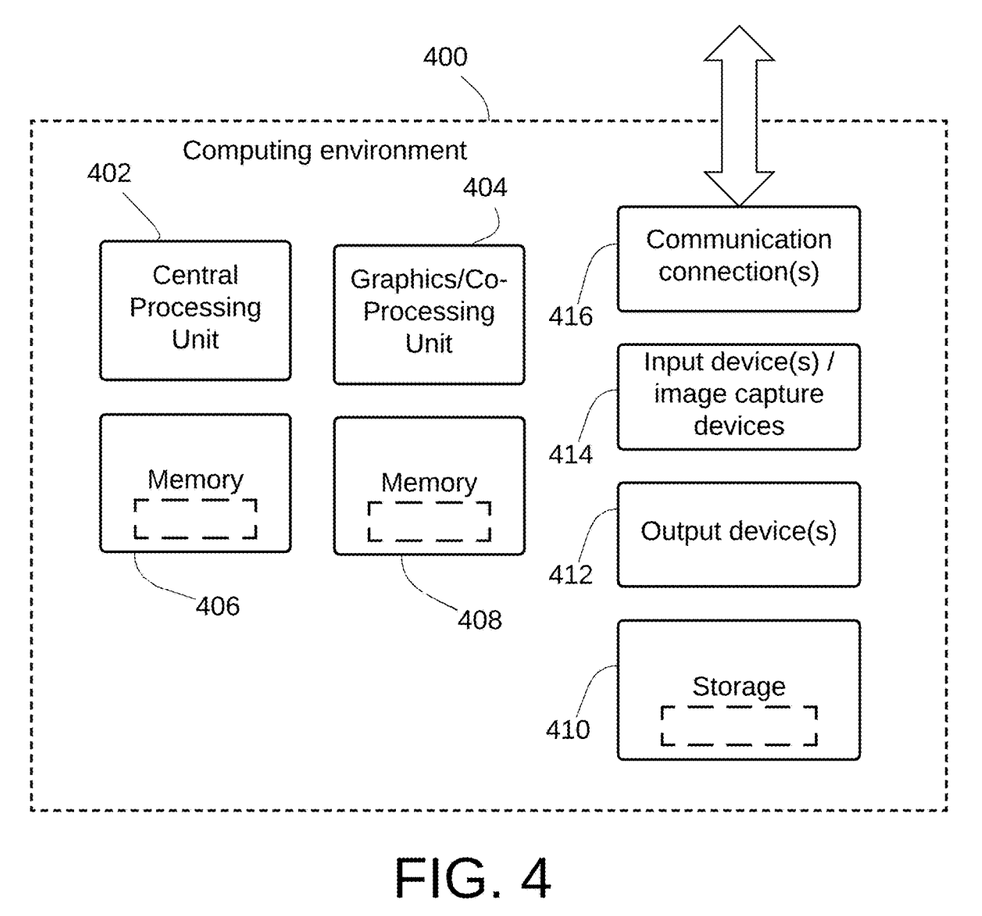
FIG. 4 illustrates a block diagram of hardware that may be employed in an implementation of the smart screen system.

FIG. 4 depicts a generalized example of a suitable general-purpose computing system 400 in which the described innovations may be implemented in order to improve the processing speed and efficiency with which the computing system 400 operates to perform the functions disclosed herein. With reference to FIG. 4, the computing system 400 includes one or more processing units 402, 404 and memory 406, 408. The processing units 402, 404 execute computer-executable instructions. A processing unit can be a general-purpose central processing unit (CPU), processor in an application-specific integrated circuit (ASIC) or any other type of processor. The tangible memory 406, 408 may be volatile memory (e.g., registers, cache, RAM), non-volatile memory (e.g., ROM, EEPROM, flash memory, etc.), or some combination of the two, accessible by the processing unit(s). The hardware components in FIG. 4 may be standard hardware components, or alternatively, some embodiments may employ specialized hardware components to further increase the operating efficiency and speed with which the system 10 operates.

Computing system 400 may have additional features such as for example, non-transitory storage 410, one or more input devices 414, one or more output devices 412, and one or more communication connections 416. An interconnection mechanism (not shown) such as a bus, controller, or network interconnects the components of the computing system 400. Typically, operating system software (not shown) provides an operating system for other software executing in the computing system 400, and coordinates activities of the components of the computing system 400.

The non-transitory storage 410 may be removable or non-removable, and includes magnetic disks, magnetic tapes or cassettes, CD-ROMs, DVDs, or any other medium which can be used to store information in a non-transitory way and which can be accessed within the computing system 400. The storage 410 stores instructions for the software implementing one or more innovations described herein.

The input device(s) 414 may be a touch input device such as a keyboard, mouse, pen, or trackball, a voice input device, a scanning device, or another device that provides input to the computing system 400. For video encoding, the input device(s) 414 may be a camera, video card, TV tuner card, or similar device that accepts video input in analog or digital form, or a CD-ROM or CD-RW that reads video samples into the computing system 400. The output device(s) 412 may be a display, printer, speaker, CD-writer, or another device that provides output from the computing system 400.

The communication connection(s) 416 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for automating usage of an application program comprising:
   detecting objects and text from a first screen of information generated by the application program for display on a computer monitor by,
      capturing a first image of the screen of information;
      generating a first signature to identify the first image;
      analyzing the first image to identify a set of actionable objects within the first image;
      performing optical character recognition to detect text fields in the first image;
      linking each identified actionable object to each detected text field positioned proximate to the identified actionable object in the first image;
      in a screen signature database, storing for the first image, the first signature, which is associated with a smart screen, wherein the smart screen stores the links between each actionable object and its correspondingly linked text field; and
   subsequently interacting with the application, and for a second screen of information displayed by the application,
      capturing a second image of a second screen of information displayed by the application program, generating a second signature to identify the second image;

in the screen signature database, searching for a previously stored signature, which comprises at least the first signature, that matches the second signature, if the second signature matches a previously stored signature, then using the stored matching signature to retrieve and utilize a previously stored smart screen, that is associated with the stored matching signature, to process the second image.

2. The computer-implemented method of claim 1 wherein the operation of linking each identified actionable object to each detected text field positioned proximate to the identified actionable object comprises:

retrieving common patterns and applying the common labels to link each identified actionable object to each detected text field positioned proximate to the identified actionable object.

3. The computer-implemented method of claim 2 further comprising:

utilizing a machine learning engine to detect the common patterns and further training the machine learning engine based on the detected common patterns to cause detection of objects in the second image with corresponding objects in a previously stored smart screen where the position of the objects differs between the second image and the previously stored smart screen.

4. The computer-implemented method of claim 1 further comprising:

if the second signature does not match the previously stored signature, then analyzing the second image to identify a set of actionable objects within the second image;

performing optical character recognition to detect text fields in the second image;

linking each identified actionable object to each detected text field positioned proximate to the identified actionable object in the second image; and storing in the screen signature database, for the second image, the new signature, which is associated with a second smart screen, wherein the second smart screen stores the links between each actionable object and its correspondingly linked text field.

5. The computer-implemented method of claim 1 further comprising storing for the first image to the screen signature database:

an associated object position identifier identifying a position of each actionable object on the first image; and a text field position identifier identifying a position of each text field on the first image.

6. The computer-implemented method of claim 1 further comprising removing background noise from the first image before analyzing the first image to identify a set of actionable objects within the first image.

7. The computer-implemented method of claim 1 wherein the application program generates multiple screens of information, the method further comprising, performing the operations of capturing, generating, analyzing, performing optical character recognition and linking for each screen of information generated by the application program.

8. The computer-implemented method of claim 1 wherein analyzing the first image to identify a set of actionable objects within the first image comprises:

analyzing the first image to identify blobs in the first image;

filtering the identified blobs to identify the set of actionable objects by retrieving one or more predefined filtering criteria that cause blobs larger or smaller than predefined sizes to be filtered out.

9. A robotic process automation system comprising:

data storage that stores a screen signature database; and a processor operatively coupled to the data storage and configured to perform operations that when executed cause the processor to automate usage of an application program by detecting objects and text from a first screen of information generated by the application program for display on a computer monitor by:

capturing a first image of the screen of information;

generating a first signature to identify the first image;

analyzing the first image to identify a set of actionable objects within the first image;

performing optical character recognition to detect text fields in the first image;

linking each identified actionable object to each detected text field positioned proximate to the identified actionable object in the first image;

in the screen signature database, storing for the first image, the first signature, which is associated with a smart screen, wherein the smart screen stores the links between each actionable object and its correspondingly linked text field; and subsequently interacting with the application, and for a second screen of information displayed by the application, capturing a second image of a second screen of information displayed by the application program, generating a second signature to identify the second image;

in the screen signature database, searching for a previously stored signature, which comprises at least the first signature, that matches the second signature, if the second signature matches a previously stored signature, then using the stored matching signature to retrieve and utilize a previously stored smart screen, that is associated with the stored matching signature, to process the second image.

10. The robotic process automation system of claim 9 wherein the operation of linking each identified actionable object to each detected text field positioned proximate to the identified actionable object comprises:

retrieving common patterns and applying the common labels to link each identified actionable object to each detected text field positioned proximate to the identified actionable object.

11. The robotic process automation system of claim 10 further comprising:

utilizing a machine learning engine to detect the common patterns and further training the machine learning engine based on the detected common patterns to cause detection of objects in the second image with corresponding objects in a previously stored smart screen where the position of the objects differs between the second image and the previously stored smart screen.

12. The robotic process automation system of claim 9 wherein the processor is further programmed to perform the operation of:

if the second signature does not match the previously stored signature, then analyzing the second image to identify a set of actionable objects within the second image;

performing optical character recognition to detect text fields in the second image;

linking each identified actionable object to each detected text field positioned proximate to the identified actionable object in the second image; and storing in the screen signature database, for the second image, the new signature, which is associated with a second smart screen, wherein the second smart screen stores the links between each actionable object and its correspondingly linked text field.

13. The robotic process automation system of claim 9 wherein the processor is further programmed to perform the operation of storing for the first image to the screen signature database:

an associated object position identifier identifying a position of each actionable object on the first image; and a text field position identifier identifying a position of each text field on the first image.

14. The robotic process automation system of claim 9 wherein the processor is further programmed to perform the operation of removing background noise from the first image before analyzing the first image to identify a set of actionable objects within the first image.

15. The robotic process automation system of claim 9 wherein the application program generates multiple screens of information, and wherein the processor is further programmed to perform the operation of performing the operations of capturing, generating, analyzing, performing optical character recognition and linking for each screen of information generated by the application program.

16. The robotic process automation system of claim 9 wherein the processor is further programmed to perform the operation of analyzing the first image to identify a set of actionable objects within the first image by:

analyzing the first image to identify blobs in the first image;

filtering the identified blobs to identify the set of actionable objects by retrieving one or more predefined filtering criteria that cause blobs larger or smaller than predefined sizes to be filtered out.

17. A tangible storage medium, having stored thereupon one or more program modules comprising computer-executable instructions for execution on a computer system, the computer-executable instructions executing on a server processor to cause the computer system to implement a computer-implemented method for automating usage of an application program comprising:

detecting objects and text from a first screen of information generated by the application program for display on a computer monitor by, capturing a first image of the screen of information;

generating a first signature to identify the first image;

analyzing the first image to identify a set of actionable objects within the first image;

performing optical character recognition to detect text fields in the first image;

linking each identified actionable object to each detected text field positioned proximate to the identified actionable object in the first image;

in a screen signature database, storing for the first image, the first signature, which is associated with a smart screen, wherein the smart screen stores the links between each actionable object and its correspondingly linked text field; and subsequently interacting with the application, and for a second screen of information displayed by the application, capturing a second image of a second screen of information displayed by the application program, generating a second signature to identify the second image;

in the screen signature database, searching for a previously stored signature, which comprises at least the first signature, that matches the second signature, if the second signature matches a previously stored signature, then using the stored matching signature to retrieve and utilize a previously stored smart screen, that is associated with the stored matching signature, to process the second image.

18. The tangible storage medium of claim 17 wherein the operation of linking each identified actionable object to each detected text field positioned proximate to the identified actionable object comprises:

retrieving common patterns and applying the common labels to link each identified actionable object to each detected text field positioned proximate to the identified actionable object.

19. The tangible storage medium of claim 18 wherein the computer-implemented method for automating usage of an application program further comprises:

utilizing a machine learning engine to detect the common patterns and further training the machine learning engine based on the detected common patterns to cause detection of objects in the second image with corresponding objects in a previously stored smart screen where the position of the objects differs between the second image and the previously stored smart screen.

20. The tangible storage medium of claim 17 wherein the computer-implemented method for automating usage of an application program further comprises, if the second signature does not match the previously stored signature, then:

analyzing the second image to identify a set of actionable objects within the second image;

performing optical character recognition to detect text fields in the second image;

linking each identified actionable object to each detected text field positioned proximate to the identified actionable object in the second image; and storing in the screen signature database, for the second image, the new signature, which is associated with a second smart screen, wherein the second smart screen stores the links between each actionable object and its correspondingly linked text field.

* * * * *